US008526819B2

(12) United States Patent
Okabe

(10) Patent No.: US 8,526,819 B2
(45) Date of Patent: Sep. 3, 2013

(54) RECEIVER, LIGHT SPECTRUM SHAPING METHOD, AND OPTICAL COMMUNICATION SYSTEM

(75) Inventor: Ryou Okabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 98 days.

(21) Appl. No.: 13/229,401

(22) Filed: Sep. 9, 2011

(65) Prior Publication Data
US 2012/0121266 A1   May 17, 2012

(30) Foreign Application Priority Data

Nov. 12, 2010   (JP) ................................. 2010-254253

(51) Int. Cl.
*H04J 4/00*   (2006.01)
*H04J 14/02*   (2006.01)
*H04B 10/69*   (2013.01)

(52) U.S. Cl.
USPC ................................ 398/76; 398/79; 398/202

(58) Field of Classification Search
USPC ..................... 398/202–214, 76, 79; 370/295, 370/535; 375/316, 260
See application file for complete search history.

(56) References Cited

U.S. PATENT DOCUMENTS

| | | | | |
|---|---|---|---|---|
| 6,525,857 | B1 * | 2/2003 | Way et al. | 398/192 |
| 7,146,103 | B2 * | 12/2006 | Yee et al. | 398/68 |
| 7,577,367 | B2 * | 8/2009 | Way | 398/183 |
| 8,107,827 | B2 * | 1/2012 | Schmidt et al. | 398/205 |
| 8,111,993 | B2 * | 2/2012 | Lowery et al. | 398/81 |
| 8,233,799 | B2 * | 7/2012 | Lowery | 398/76 |
| 2001/0021047 | A1 * | 9/2001 | Sasai et al. | 359/124 |
| 2002/0154660 | A1 * | 10/2002 | Derventzis et al. | 370/537 |
| 2003/0198477 | A1 * | 10/2003 | Kuri et al. | 398/183 |
| 2006/0171633 | A1 * | 8/2006 | Voigt | 385/37 |
| 2009/0092393 | A1 * | 4/2009 | Xu et al. | 398/79 |
| 2009/0245816 | A1 | 10/2009 | Liu et al. | |
| 2010/0021166 | A1 * | 1/2010 | Way | 398/79 |

FOREIGN PATENT DOCUMENTS

JP   2009-253972 A   10/2009

OTHER PUBLICATIONS

Dong et al, "Transmission performance of optical OFDM signals with low peak-to-average power ratio by a phase modulator", Nov. 1, 2009, Optics Communications, vol. 282, Issue 21, pp. 4194-4197.*
Schmidt et al, "Experimental Demonstrations of Electronic Dispersion Compensation for Long-Haul Transmission Using Direct-Detection Optical OFDM", Jan. 1, 2008, Journal of Lightwave Technology, vol. 26, No. 1, pp. 196-203.*
Fan, Shu-Hao et al., "Optical OFDM Scheme Using Uniform Power Transmission to Mitigate Peak-to-Average Power Effect Over 1040 km Single-Mode Fiber," Journal of Optical Communications and Networking, IEEE, vol. 2, No. 9, Sep. 1, 2010, pp. 711-715.

(Continued)

*Primary Examiner* — Kenneth N Vanderpuye
*Assistant Examiner* — Dibson Sanchez
(74) *Attorney, Agent, or Firm* — Fujitsu Patent Center

(57) ABSTRACT

A receiver receiving a phase-modulated optical frequency division multiplexed signal is provided. The receiver includes a light spectrum shaper configured to extract a carrier wave and a modulated light component contained in either one of a short-wavelength-side waveband or a long-wavelength-side waveband with respect to the carrier wave, to output a spectrum-shaped light signal; and an optical-to-electric converter configured to convert the spectrum-shaped light signal into an electric signal.

15 Claims, 12 Drawing Sheets

(56) References Cited

OTHER PUBLICATIONS

Nezam, S. M. R. M. et al. "DOP-Based MD Monitoring I Optical Subcarrier Multiplexed Systems by Carrier/Sideband Equalization," Optical Fiber Communication Conference (OFC), Postconference Digest, Atlanta, GA, Mar. 23-28, 2003, vol. 2, vol. 86, pp. 593-595.

Extended European Search Report dated Feb. 17, 2012 for corresponding European Application No. 11180872.1.

Rossi, Giammarco et al., "Optical SCM Data Extraction Using a Fiber-Loop Mirror for WDM Network Systems", IEEE Photonics Technology Letters, vol. 12, No. 7, Jul. 2000; pp. 897-899.

* cited by examiner

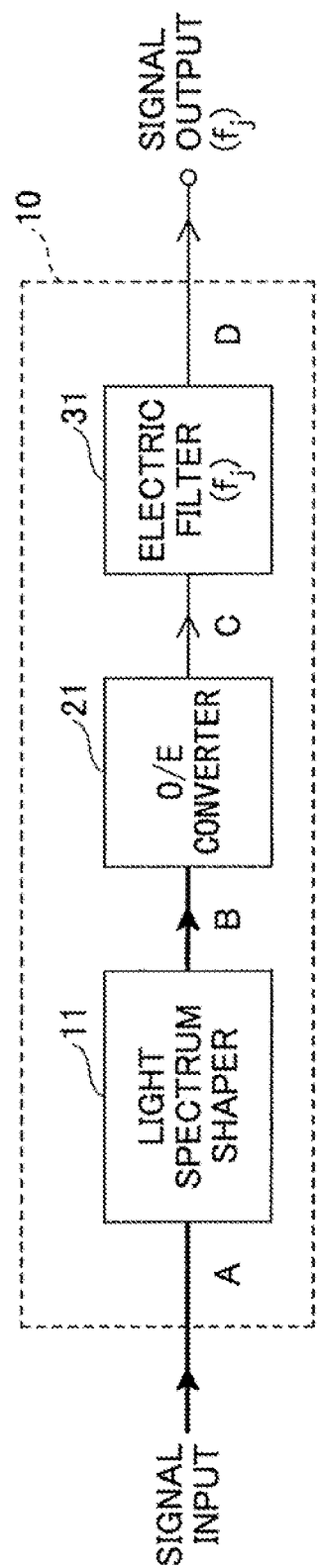

BEFORE SPECTRUM SHAPING

EXAMPLE 1 OF SPECTRUM SHAPING

EXAMPLE 2 OF SPECTRUM SHAPING

LIGHT SPECTRUM

RF SPECTRUM

RF Spectrum at Point C

RF Spectrum at Point D

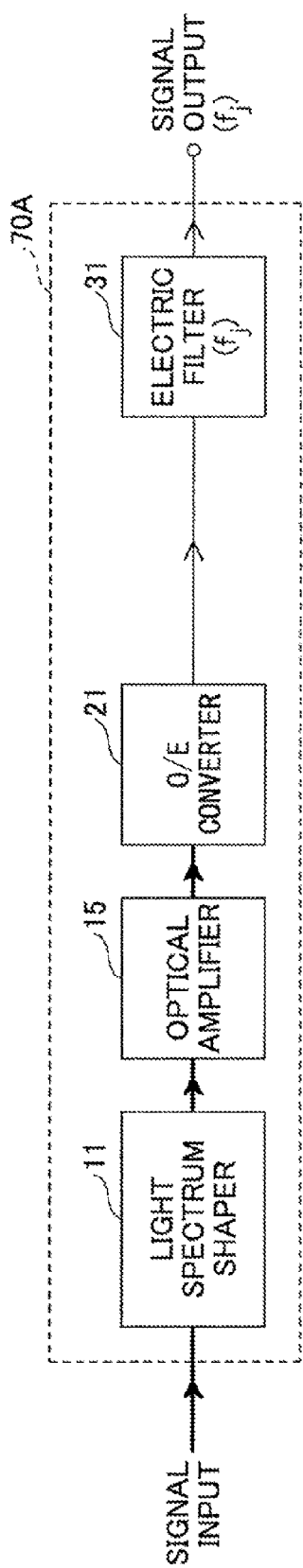
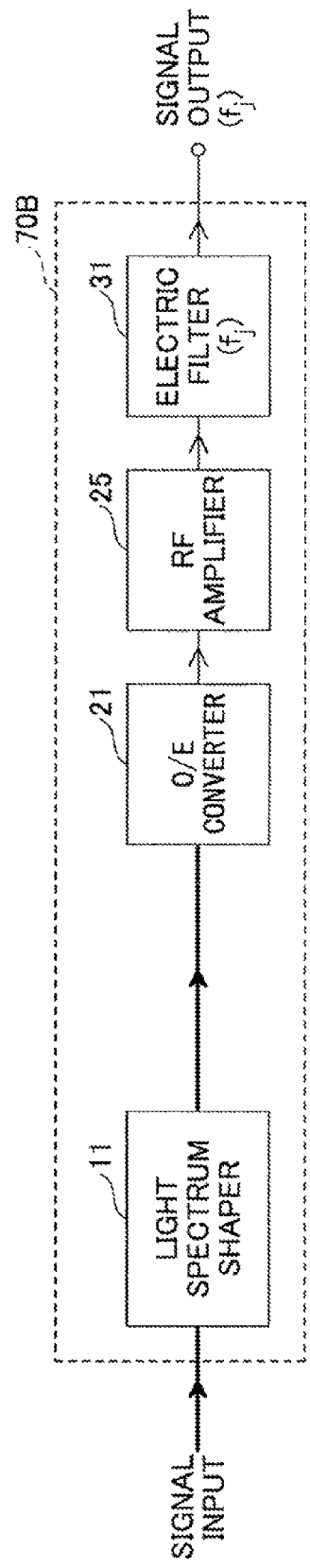

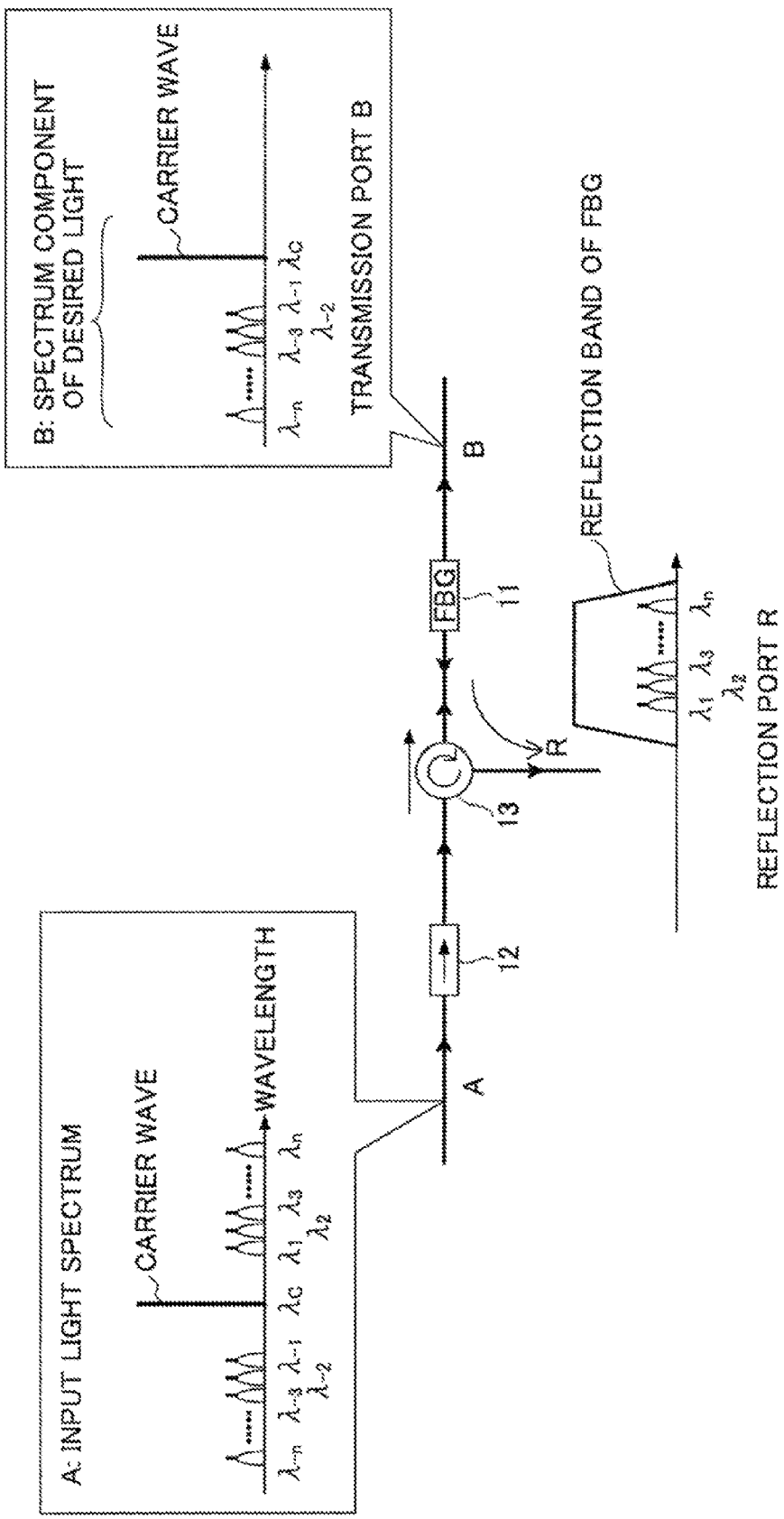

RECEIVER, LIGHT SPECTRUM SHAPING METHOD, AND OPTICAL COMMUNICATION SYSTEM

CROSS REFERENCE TO RELATED APPLICATIONS

This application is based upon and claims the benefit of priority of the prior Japanese Patent Application No. 2010-254253 filed on Nov. 12, 2010, the entire contents of which are incorporated herein by references.

FIELD

The embodiments discussed herein relate to a receiver, a light spectrum shaping method, and an optical communication system.

BACKGROUND

In today's optical communication systems, various studies and research have been conducted in order to develop technologies for large-capacity and long-distance transmission. Regarding transmission rate, modulation schemes superior in transmission characteristics and modulation efficiency have been researched. Concerning capacity enhancement, multiplexing schemes including wavelength division multiplexing (WDM), time division multiplexing, and polarization multiplexing have been researched. These studies and research are beneficial for dealing with continuously increasing information capacity.

Known modulation schemes include on-off keying (OOK) to modulate data making use of simple blinking of light signals, and phase shift keying (PSK) to modulate data by changing the phase of light signal. In addition, multilevel multi-phase modulation (m-PSK, n-ASK), which has high frequency usage efficiency, or orthogonal frequency division multiplexing (OFDM) are also attracting attention.

Besides these backbone communication schemes, optical frequency division multiplexing (referred to as "optical FDM") has been proposed, which is applied mainly to a high-speed data distribution system at a transmission rate of several megabytes per second (Mb/s) to distribute video pictures or the like. Optical FDM is a transmission technique for multiplexing sub-carrier frequencies $f_i$ onto the frequency axis of a continuous wave (CW) carrier light. Optical FDM generally employs on-off keying to modulate the intensity of carrier light (wave) or phase keying to modulate the phase of light.

A technique for applying subcarrier multiplexing to a wavelength division multiplexing (WDM) network is also known. This technique is used to construct a broadband multimedia network. For example, superposing a sub-carrier multiplexed (SCM) control signal onto a baseband signal is proposed. (See Non-patent Document 1 listed below.) In this technique, a data-multiplexed baseband signal is used as a carrier wave. An intensity-modulated SCM signal is superposed onto the baseband signal. At a receiving site, the received signal is separated into the baseband signal and the SCM signal using a loop interferometer (filter). With this filtering technique, the SCM signal is completely separated from the baseband signal. In other words, the separated SCM signal has lost the carrier wave component, and is converted into a baseband signal without the carrier wave component. If two or more SCM signal components are multiplexed densely, the converted baseband signals interfere with each other and a desired channel cannot be extracted.

PRIOR ART DOCUMENTS

Patent Document 1:
Japanese Laid-Open Patent Publication No. 2009-253972
Non-Patent Document 1:
Giammarco Rossi, et al. "Optical SCM Data Extraction Using a Fiber-Loop Mirror for WDM Network Systems", IEEE Photonics Technology Letters, Vol. 12, No. 7, July 2000

Meanwhile, if phase-modulated optical FDM signal components are multiplexed onto a carrier wave and received simultaneously at a photodetector (PD), modulated signal component $J_1$ and modulated signal modulated component $J_{-1}$ cancel each other. In this case, an optical-to-electric converted component cannot be obtained. This phenomenon is explained with reference to FIG. 1A and FIG. 1B.

FIG. 1A illustrates light spectra of a phase-modulated carrier wave $J_0(mf)$ and signal components multiplexed on it. Each of the signal components is phase-modulated at subcarrier frequency fi and multiplexed onto the carrier wave (which has a wavelength of $\lambda c$). If the modulation index is $m_f$ and the n-th order Bessel function of the first kind is $J_n(mf)$, then phase-modulated spectrum components $J_1(mf)$ and $J_{-1}(mf)$ appear in the short-wavelength waveband ($\lambda_{-i}$) and the long-wavelength waveband ($\lambda_i$), respectively, in a symmetrical manner with respect to the carrier wave.

If the modulated signal components $J_1(mf)$ and $J_{-1}(mf)$ are received simultaneously at a photodetector, both components are extinguished due to the nature of the Bessel function, that is, $J_1(mf) = J_{-1}(mf)$.

A conventional method for solving this problem is to insert an optical filter before the photodetector in order to extracts a targeted signal component before photodetection. However, there is a limit to narrow the bandwidth of a typical optical filter at 10 GHz or so in the existing circumference in terms of insertion loss. If an optical filter with a narrower bandwidth is inserted, the insertion loss will increase and the suppression ratio of the optical filter will be degraded.

In the circumstances where many signal components are multiplexed densely as illustrated in FIG. 1B, a typical optical filter cannot correctly extract a targeted signal component. For example, when extracting a targeted signal component $\lambda_2$ using a typical optical filter, adjacent signal components $\lambda_1$ and $\lambda_3$ are extracted together, and interference or crosstalk occurs. This means that due to limitations of extractable bandwidth of an optical filter, the frequency interval in signal multiplexing is also limited. This constraint prevents efficient use of frequency band.

For example, if optical FDM signal components are multiplexed at intervals of 100 MHz, the signal components are adjacent to each other at wavelength interval of 0.0008 nm (0.8 pm). If, under this condition, the wavelength of the carrier light (wave) fluctuates due to a temperature change in the light source, the central frequency of the optical filter will shift and the targeted channel cannot be extracted correctly in a stable manner. Thus, the conventional technique of inserting an optical filter before photodetection has its own limit.

It is desired to realize a technique for extracting a targeted channel from optical FDM signals multiplexed through phase modulation onto a carrier wave in an accurate and stable manner.

SUMMARY

According to one aspect of the present disclosure, a receiver receiving a phase-modulated optical frequency division multiplexed signal is provided. The receiver includes:

a light spectrum shaper configured to extract a carrier wave and a modulated light component contained in either one of a short-wavelength-side waveband or a long-wavelength-side waveband with respect to the carrier wave, to output a spectrum-shaped light signal; and an optical-to-electric converter configured to convert the spectrum-shaped light signal into an electric signal.

According to another aspect of the present disclosure, a light spectrum shaping method is provided. The method includes:

receiving a phase-modulated optical frequency division multiplexed signal as an input light signal; and extracting a carrier wave together with a modulated light component contained in either one of a short-wavelength-side waveband or a long-wavelength-side waveband with respect to the carrier wave to output a spectrum-shaped light signal.

According to still another aspect of the present disclosure, an optical communication system is provided. The system includes:

an optical medium configured to transmit a phase-modulated optical frequency division multiplexed signal; and a receiver configured to receive the phase-modulated optical frequency division multiplexed signal through the optical medium, wherein the receiver extracts a carrier wave and a modulated light component contained in either one of a short-wavelength-side waveband or a long-wavelength-side waveband with respect to the carrier wave from the phase-modulated optical frequency division multiplexed signal, and converts the extracted light signal component into an electric signal.

The object and advantages of the invention will be realized and attained by means of the elements and combinations particularly pointed out in the claims. It is to be understood that both the foregoing general description and the following detailed description are exemplary and explanatory and are not restrictive to the invention as claimed.

BRIEF DESCRIPTION OF DRAWINGS

FIG. 2 illustrates a basic structure of an optical receiver according to an embodiment;

FIG. 7A illustrates Example 1 of the optical receiver according to an embodiment;

FIG. 7B illustrates Example 2 of the optical receiver according to an embodiment;

FIG. 9 illustrates a structure of extracting a desired spectrum component of a light signal at a transmission port using a fiber Bragg grating as a light spectrum shaper;

DESCRIPTION OF EMBODIMENTS

Figure 1A:
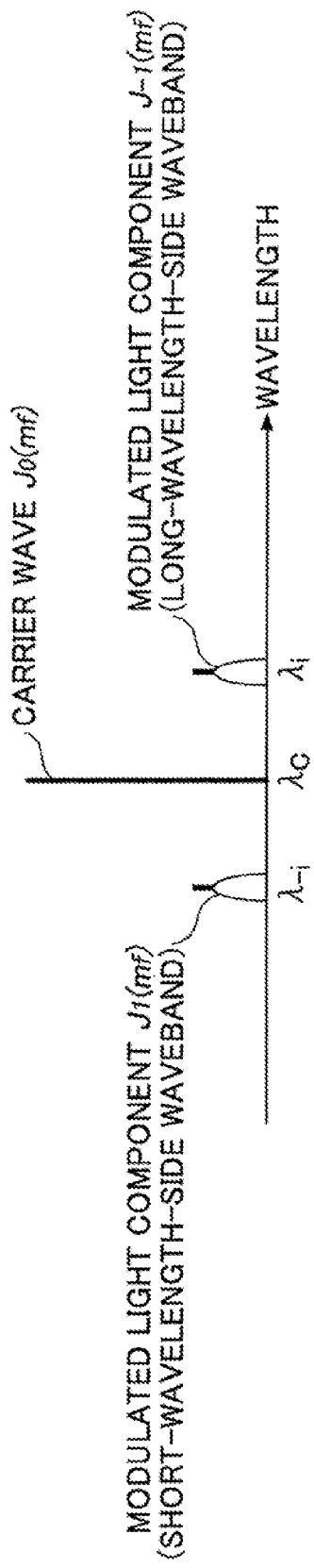
FIG. 1A illustrates light spectrum of a phase-modulated optical FDM signal.
Figure 1B:
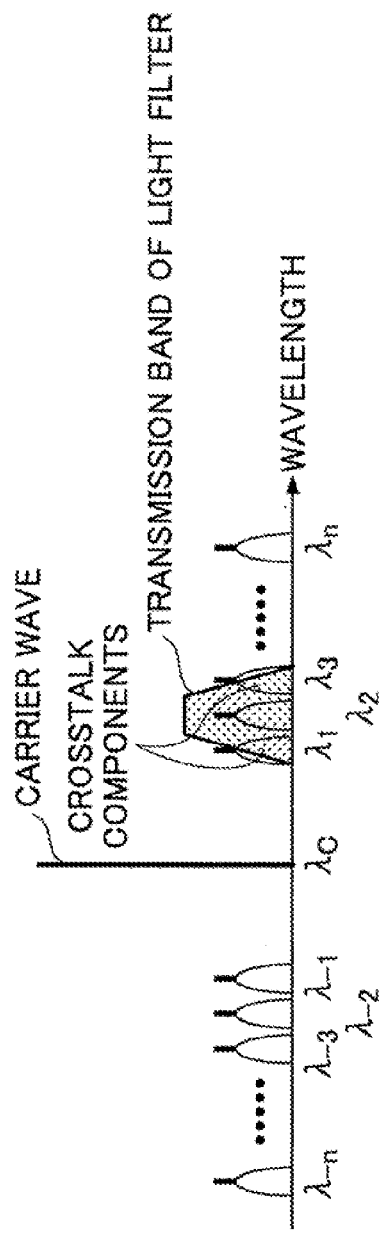
FIG. 1B is a diagram explaining a problem arising when extracting an optical signal component using a conventional light filter.

The embodiments are now described with reference to accompanying drawings. FIG. 2 illustrates a basic structure of an optical receiver according to an embodiment. The optical receiver 10 is used in an optical communication system in which light signals travel through an optical medium such as an optical fiber (not shown). The optical receiver 10 receives an optical frequency division multiplexed (FDM) signal in which data are modulated by phase modulation.

The optical receiver 10 includes a light spectrum shaper 11, a optical-to-electric (O/E) converter 12, and an electric filter 31. The light spectrum shaper 11 performs spectrum shaping on the inputted optical FDM signal so as to extract the carrier wave, together with a light component contained in either one of a short-wavelength-side waveband or a long-wavelength-side waveband with respect to the carrier wave, from the optical FDM signal. The optical-to-electric converter 21 converts the spectrum-shaped light signal into an electric signal. The electric filter 31 extracts a targeted channel ($f_j$) from the electric signal, and outputs the extracted channel (signal), which signal is then supplied to a demodulator circuit and a digital signal processor.

Figure 3A:
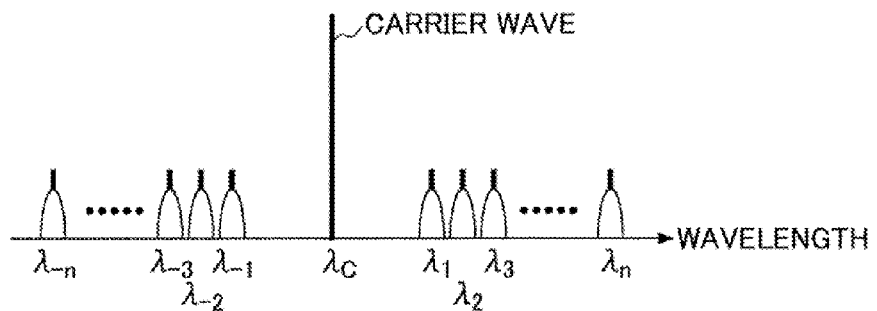
FIG. 3A illustrates a light signal spectrum at point A before the signal is input to the light spectrum shaper illustrated in FIG. 2.
Figure 3B:
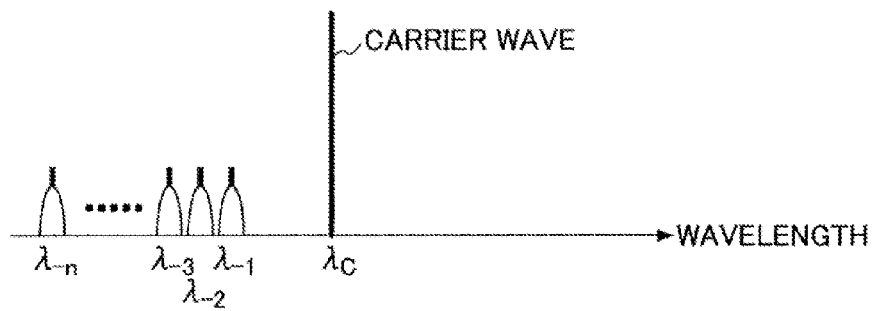
FIG. 3B illustrates an example of spectrum shaping, which spectrum is observed at point B after the input signal has been subjected to spectrum shaping.
Figure 3C:
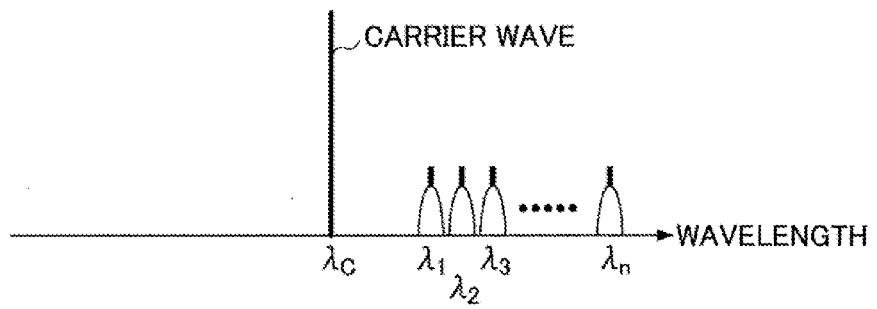
FIG. 3C illustrates another example of spectrum shaping, which spectrum is observed at point B after the input signal has been subjected to spectrum shaping.

FIG. 3A through FIG. 3C illustrate spectrum shaping performed by the light spectrum shaper 11 of FIG. 2. FIG. 3A is a signal spectrum observed at point A of FIG. 2 before the light signal is input to the light spectrum shaper 11. The inputted light signal is an optical FDM signal in which carrier signals are multiplexed at frequencies $f_1, f_2, \ldots, f_n$, and modulated onto a carrier wave or a main carrier ($\lambda c$) through phase modulation at a transmission site (not shown). By modulating the carrier wave ($\lambda c$) with the frequency-multiplexed carrier signals (sub-carriers) having wavelengths corresponding to $f_1, f_2, \ldots, f_n$, two groups of modulation components appear, one on either side of the carrier wave ($\lambda c$). Namely, a modulation component group containing wavelength components $\lambda_1, \lambda_2, \ldots, \lambda_n$ appears in a lower frequency band (called a "long-wavelength-side waveband") with respect to the carrier wave $\lambda c$, and a modulation component group containing wavelength components $\lambda_{-1}, \lambda_{-2}, \ldots, \lambda_{-n}$ appears in a higher frequency band (called a "short-wavelength-side waveband") with respect to the carrier wave $\lambda c$. As has been explained in conjunction of FIG.

1A, the modulated light signal components $J_i$ and $J_{-i}$ at wavelength ($\lambda_{-i}$ and $\lambda_i$) cancel each other in photodetection, and accordingly, they are not detected at a photodetector.

To overcome this issue, either one of the light component in the short-wavelength-side waveband or that in the long-wavelength-side waveband of the optical FDM signal is removed by the light spectrum shaper 11, as illustrated in FIG. 3B and FIG. 3C, before the optical FDM signal is supplied to the optical-to-electrical converter (e.g., a photodetector). During this process, the main carrier (i.e., the carrier wave λc) is always extracted together with the unremoved light component.

In FIG. 3B, the light component of the long-wavelength-side waveband is removed, while the carrier wave (λc) and the light components of the short-wavelength-side waveband are maintained. In FIG. 3C, the light component of the short-wavelength-side waveband is removed, while the carrier wave (λc) and the light components of the long-wavelength-side waveband are maintained. This spectrum shaping can avoid the inconvenience due to the nature of the first-order Bessel function of the first kind, namely, mutual cancellation of the phase-modulated components symmetrical with respect to the carrier wave (λc).

Figure 4A:
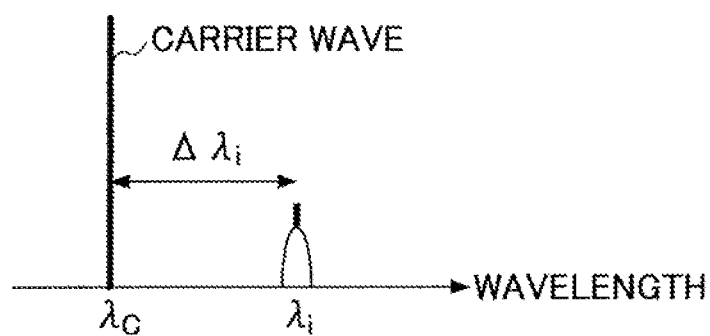
FIG. 4A illustrates a light spectrum of the spectrum-shaped light signal to be supplied to an optical-to-electric converter.
Figure 4B:
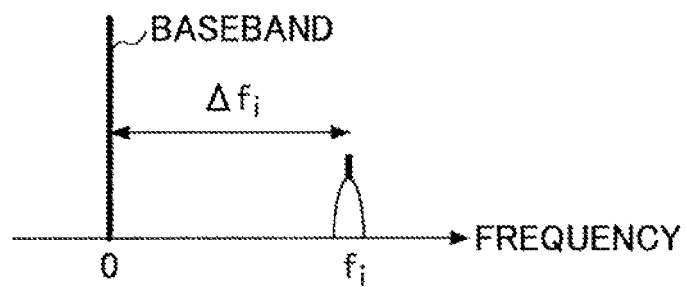
FIG. 4B illustrates an RF spectrum of an electric signal observed at point C after having been subjected to the optical-to-electric conversion.

FIG. 4A and FIG. 4B illustrate optical-to-electric conversion carried out by the O/E converter 21 of FIG. 2. FIG. 4A is a light spectrum including a modulated light component of wavelength λi and the carrier wave (main carrier) λc, which are contained in the spectrum-shaped signal component to be input to the O/E converter 21. FIG. 4B is a RF spectrum of the electric signal corresponding to the light spectrum of FIG. 4A, which is observed at point C after the optical-to-electric conversion and contains a baseband frequency and a frequency component $f_i$.

If the distance between the carrier wave λc and the modulated light component along the wavelength axis is $\Delta\lambda i$ as illustrated in FIG. 4A, then a carrier frequency at which the corresponding signal component of the optical FDM signal is multiplexed appears at $\Delta f_i$ with respect to the main baseband frequency along the frequency axis, as illustrated in FIG. 4B.

The relationship between $\Delta\lambda i$ and $\Delta f_i$ is expressed by equation (1).

$$\Delta\lambda i = (\lambda c^2/c) \times \Delta f_i, \quad (1)$$

where c denotes the speed of light, and λc denotes the wavelength of the carrier wave.

As long as the information about the carrier wave (λc) is maintained in the spectrum-shaped light signal, the modulated light components contained in the spectrum-shaped optical FDM signal can be received simultaneously and all together at the O/E converter 21. This is because the information about the frequency interval of individual light component from the main carrier frequency is maintained even if multiple channels are multiplexed in the spectrum-shaped light signal as illustrated in FIG. 3B and FIG. 3C. The spectrum-shaped light signal is then converted into an electric signal. The RF spectrum of the O/E converted signal observed at point C is illustrated in FIG. 5.

Figure 5:
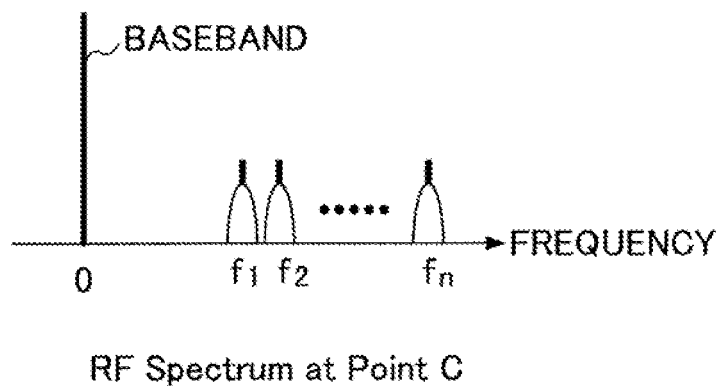
FIG. 5 illustrates an RF spectrum of an optical-to-electric converted signal (at point C) when the spectrum-shaped light signal contains multiple wavelength components.

In FIG. 5, frequency components $f_1$, $f_2$, $f_n$ are obtained through the O/E conversion, which frequencies correspond to the sub-carrier frequencies multiplexed at the transmission site.

If the light spectrum is shaped without extracting the carrier wave (main carrier) λc, information about the frequency interval $\lambda f_i$ is lost and as a result, all the channels contained in the O/E converted signal become an intensity modulated signal of the baseband. For this reason, the spectrum-shaped light components cannot be received simultaneously at the photodetector. In contrast, the light spectrum shaper 11 of the embodiment is adapted to extract the carrier wave (λc) together with the desired portion of the spectrum-shaped light components.

Figure 6:
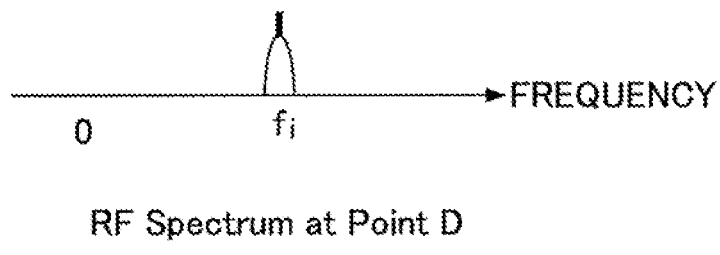
FIG. 6 illustrates an RF spectrum observed at point D, at which a desired channel is extracted by an electric filter.

FIG. 6 illustrates an RF spectrum of a targeted channel $f_i$ extracted by the electric filter 31, which is observed at point D of FIG. 2. The electric filter 31 may be an arbitrary filtering circuit configured to extract a desired frequency component from the electric signal. By using the electric filter 31, a narrowband carrier signal such as several MHz can be extracted correctly with a simple and inexpensive structure.

With the above-described arrangement of the embodiment, a several MHz narrowband channel, which can be hardly separated using a conventional light filter, is extracted correctly in a simple manner using an electric filter. Even if the wavelength of the carrier wave (main carrier) fluctuates, the information about the distance between the carrier wave and individual modulated light component multiplexed on the carrier wave is maintained. Consequently, the center frequency of the electric filter is unchanged, and a targeted channel is extracted in a stable manner.

Examples

Figure 7C:
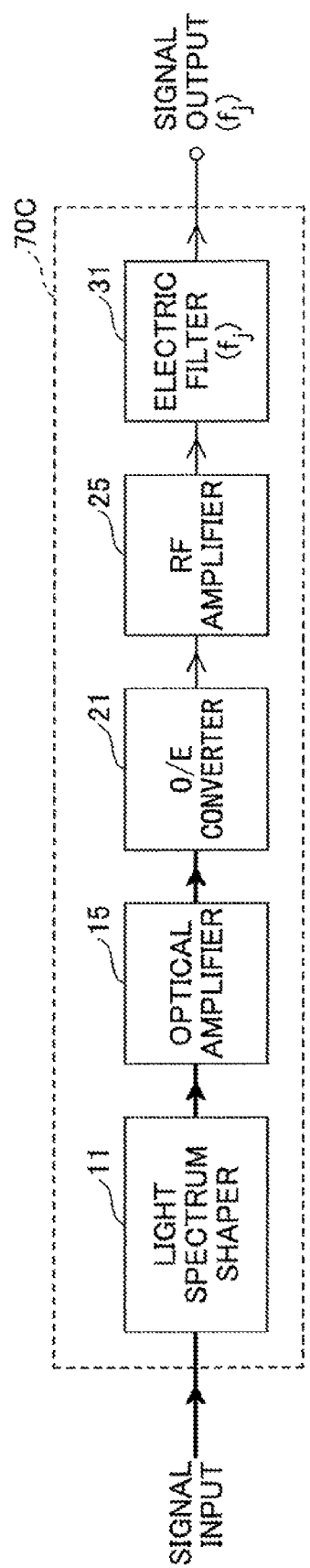
FIG. 7C illustrates Example 3 of the optical receiver according to an embodiment.

FIGS. 7A, 7B and 7C illustrates Examples 1, 2 and 3 of the structure of optical receivers 70A, 70B and 70C, respectively, according to the embodiment. In Example 1 illustrated in FIG. 7A, the optical receiver 70A has an optical amplifier 15 between the light spectrum shaper 11 and the optical-to-electric converter 21 to increase the signal power level input to the optical-to-electric converter 21. The optical amplifier 15 is an arbitrary one, such as an optical fiber amplifier, a semiconductor light amplifier, or an optical parametric amplifier. By amplifying the power level of the input light to the optical-to-electric converter 21, which input light includes the spectrum-shaped light components together with the carrier wave λc, the targeted signal component (channel) extracted from the electric filter 31 becomes more accurate.

In Example 2 illustrated in FIG. 7B, the optical receiver 70B has a power amplifier 25 next to the optical-to-electric converter 21. The power amplifier 25 amplifies the electric signal output from the optical-to-electric converter 21. By amplifying the electric signal to be supplied to the electric filter 31, extraction of the frequency component centered on the targeted frequency can be performed more accurately. The power amplifier 25 is, for example, an RF amplifier.

In Example 3 illustrated in FIG. 7C, the optical receiver 70C has an optical amplifier 15 between the light spectrum shaper 11 and the optical-to-electric converter 21, as well as a power amplifier 25 placed after the optical-to-electric converter 21. With this arrangement, the spectrum-shaped modulated light components are optically amplified, and the power level of the O/E converted electric signal is amplified. The filtering operation of the electric signal becomes more reliable.

In any structure illustrated in FIGS. 7A, 7B or 7C, the light signal (i.e., the phase-modulated optical FDM signal) received at the optical receiver 70A, 70B or 70C is subjected to the light spectrum shaping process. This light spectrum shaping process is to eliminate the symmetry of the modulated light components along the wavelength axis, while maintaining the carrier wave (main carrier) λc. The spectrum-shaped light signal is input to the optical-to-electric converter 21, at which converter an individual light component is converted correctly to a frequency component without causing signal cancellation due to the nature of the Bessel function.

The electric signal output from the optical-to-electric converter 21 is supplied to the electric filter 31 and a targeted channel is extracted.

The light spectrum shaper 11 is, for example, an optical filter, a fiber Bragg grating (FBG), an arrayed waveguide grating (AWG), an optical interleaver, an optical low-pass filter (LPF), an optical high-pass filter (HPF), or any other suitable device capable of extracting desired light components together with the carrier wave (main carrier) $\lambda c$.

The optical-to-electric converter 21 is any type of photodetector or light-receiving device, such as a PIN photodiode, an avalanche photodiode (APD), or a photomultiplier tube (PMT). The electric filter 31 is, for example, an RF band-pass filter, a LPF, a HPF, etc.

Figure 8A:
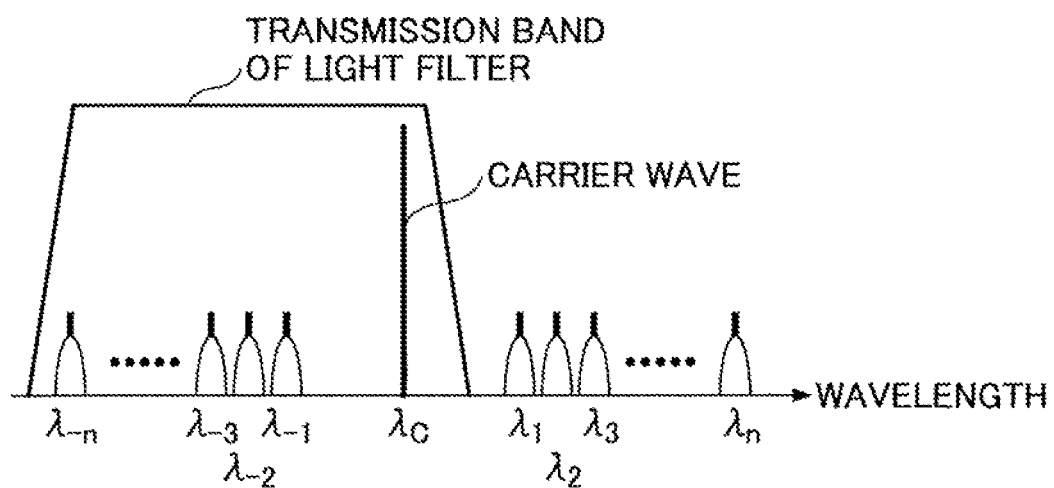
FIG. 8A illustrates an example of spectrum shaping using a light band-pass filter as a light spectrum shaper.
Figure 8B:
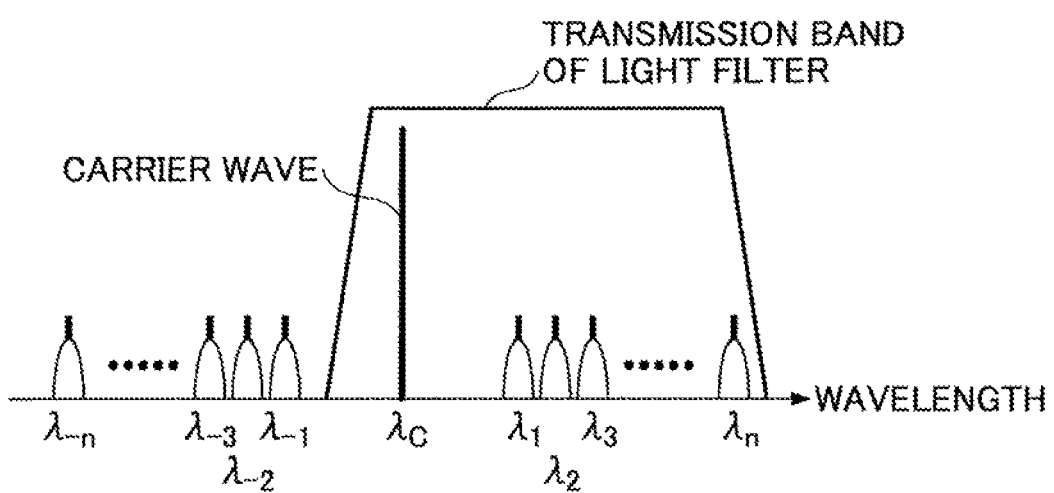
FIG. 8B illustrates another example of spectrum shaping using a light band-pass filter as a light spectrum shaper.

FIG. 8A and FIG. 8B illustrate examples of light spectrum shaping using an optical band-pass filter as the light spectrum shaper 11. In FIG. 8A, the band-pass filter allows the carrier wave and the modulated light components contained in the short-wavelength-side waveband to pass through. Accordingly, the carrier wave $\lambda c$ and the modulated light components with wavelengths shorter than $\lambda c$ are output from the light spectrum shaper 11 and supplied to the optical-to-electric converter 21. In FIG. 8B, the band-pass filter allows the carrier wave and the modulated light components contained in the long-wavelength-side waveband to pass through. Accordingly, the carrier wave $\lambda c$ and the modulated light components with wavelengths longer than $\lambda c$ are output from the light spectrum shaper 11 and supplied to the optical-to-electric converter 21. In either case, cancellation of phase-modulated light components does not occur during the optical-to-electric conversion.

FIG. 9 illustrates an example of light spectrum shaping using a fiber Bragg grating (FBG) as the light spectrum shaper 11. In this example, a light spectrum B that includes the carrier wave $\lambda c$ and the modulated light components in a desired waveband (for example, in the short-wavelength-side waveband) is extracted at the transmission port B of the FBG 11. The optical receiver 70 has an optical isolator 12 and an optical circulator 13 placed before the FBG 11.

Before the light shaping, the light spectrum A (observed at point A) of the phase-modulated optical FDM signal input to the optical receiver 70 contains the carrier wave $\lambda c$, wavelength components $\lambda_{-1}, \lambda_{-2}, \ldots, \lambda_{-n}$ appearing on the short-wavelength-side of $\lambda c$, and wavelength components $\lambda_1, \lambda_2, \ldots, \lambda_n$ appearing in the long-wavelength-side of $\lambda c$, as illustrated in FIG. 3A. This input light signal is supplied via the optical isolator 12 and the optical circulator 13 to the FBG 11. The FBG 11 of this example is designed so as to have a reflecting band corresponding to the long-wavelength-side waveband of the optical FDM signal. Accordingly, the FBG 11 blocks the wavelength components of the long-wavelength-side waveband. The reflecting bandwidth of the FBG 11 can be controlled by adjusting the refractive index change and the length of the FBF 11.

While blocking the long-wavelength-side waveband of the optical FDM signal, the FBG 11 outputs a desired light spectrum component B to its transmission port B. The light spectrum component B includes the carrier wave $\lambda c$ and the modulated light components $\lambda_{-1}, \lambda_{-2}, \ldots, \lambda_{-n}$, in the short-wavelength-side waveband. The blocked light components $\lambda_1, \lambda_2, \ldots, \lambda_n$ contained in the long-wavelength-side waveband are reflected back to the optical circulator 13 and output to the reflection port R. If, the other way round, the FBG 11 is designed so as to block the short-wavelength-side waveband component, then the carrier wave $\lambda c$ and the long-wavelength-side waveband component are extracted at the transmission port B.

Figure 10:
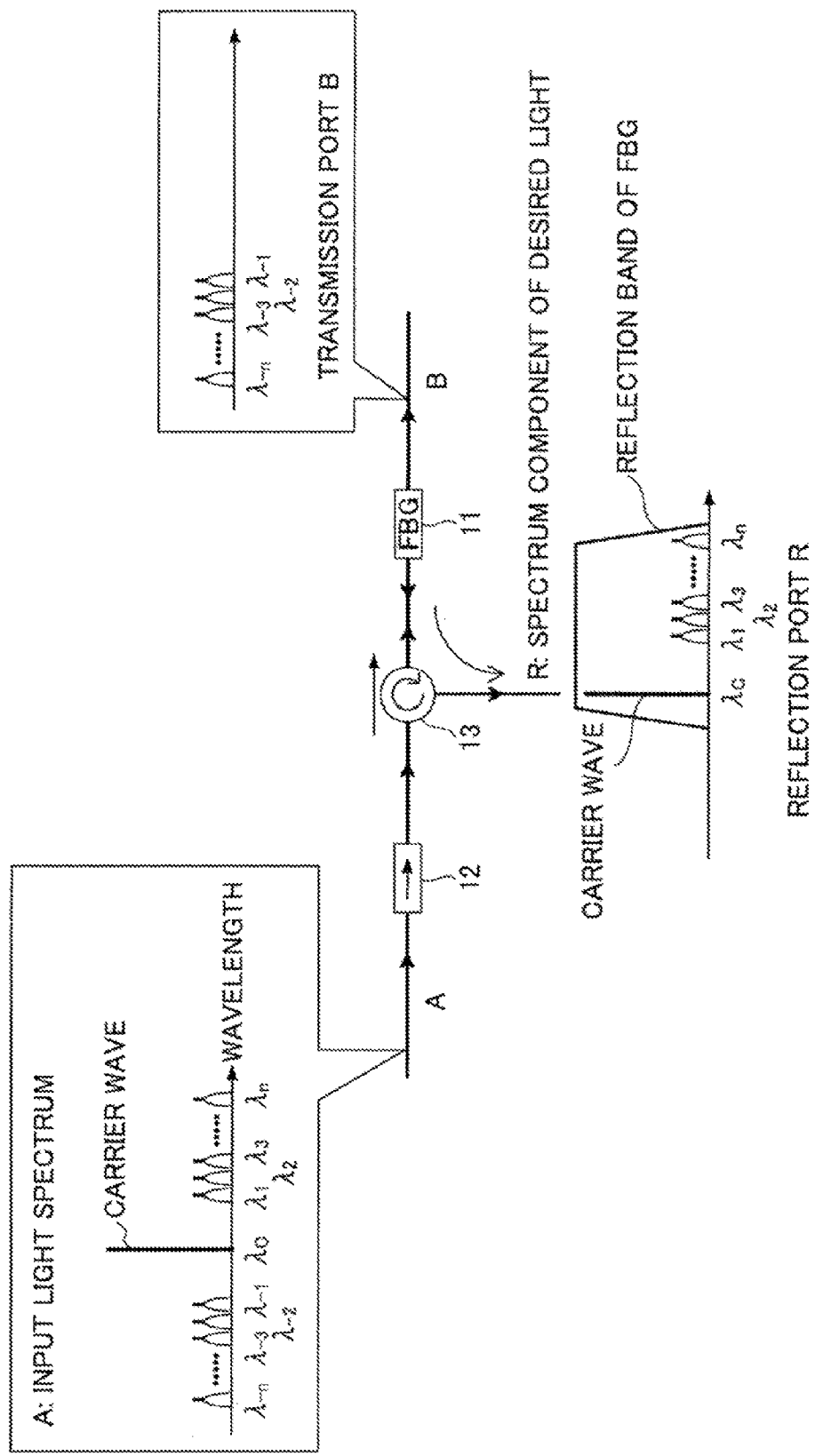
FIG. 10 illustrates a structure of extracting a desired spectrum component of a light signal at a reflection port using a fiber Bragg grating as a light spectrum shaper.

FIG. 10 illustrates another example of light spectrum shaping using a fiber Bragg grating (FBG) as the light spectrum shaper 11. In this example, a light spectrum R that includes the carrier wave $\lambda c$ and the modulated light components in a desired waveband (e.g., in the long-wavelength-side waveband) is extracted at the reflection port R of the FBG 11.

The light spectrum A (observed at point A) of the phase-modulated optical FDM signal input to the optical receiver 70 is supplied via the optical isolator 12 and the optical circulator 13 to the FBG 11. The FBG 11 is designed so as to have a reflecting band corresponding to the long-wavelength-side waveband of the optical FDM signal. Accordingly, the FBG 11 blocks the wavelength components of the long-wavelength-side waveband.

While blocking the long-wavelength-side waveband of the optical FDM signal, the FBG 11 outputs only the light spectrum components contained in the short-wavelength-side waveband to the transmission port B in order to remove the short-wavelength-side waveband component. The reflected portion that includes the carrier wave $\lambda c$ and the modulated light components $\lambda_1, \lambda_2, \ldots, \lambda_n$ is returned to the optical circulator 13, output to the reflection port R, and supplied to the optical-to-electric converter 21.

With either structure illustrated in FIG. 9 or FIG. 10, cancellation of symmetric components of the phase-modulated optical FDM signal can be prevented in the subsequent optical-to-electric conversion.

Advanced Examples

The above-described spectrum shaping performed by the light spectrum shaper 11 is suitable when receiving all the channels of re-channel-multiplexed optical FDM signal. In the above-describe examples, all the light components contained in either one of the short-wavelength-side waveband or the long-wavelength-side waveband are extracted together with the carrier wave $\lambda c$. When a FBG 11 is used, all the signal components contained in either one of the short-wavelength-side waveband or the long-wavelength-side waveband are taken out, together with the carrier wave $\lambda c$ at the transmission port (FIG. 9) or the reflecting port (FIG. 10).

However, if a specific channel to be extracted is known in advance, it is necessary to receive all the light components at the photodetector.

Accordingly, in an advanced example, the light spectrum is shaped so as to maintain only a targeted portion of the modulated light signals, together with the carrier wave $\lambda c$ during the spectrum shaping process.

Figure 11:
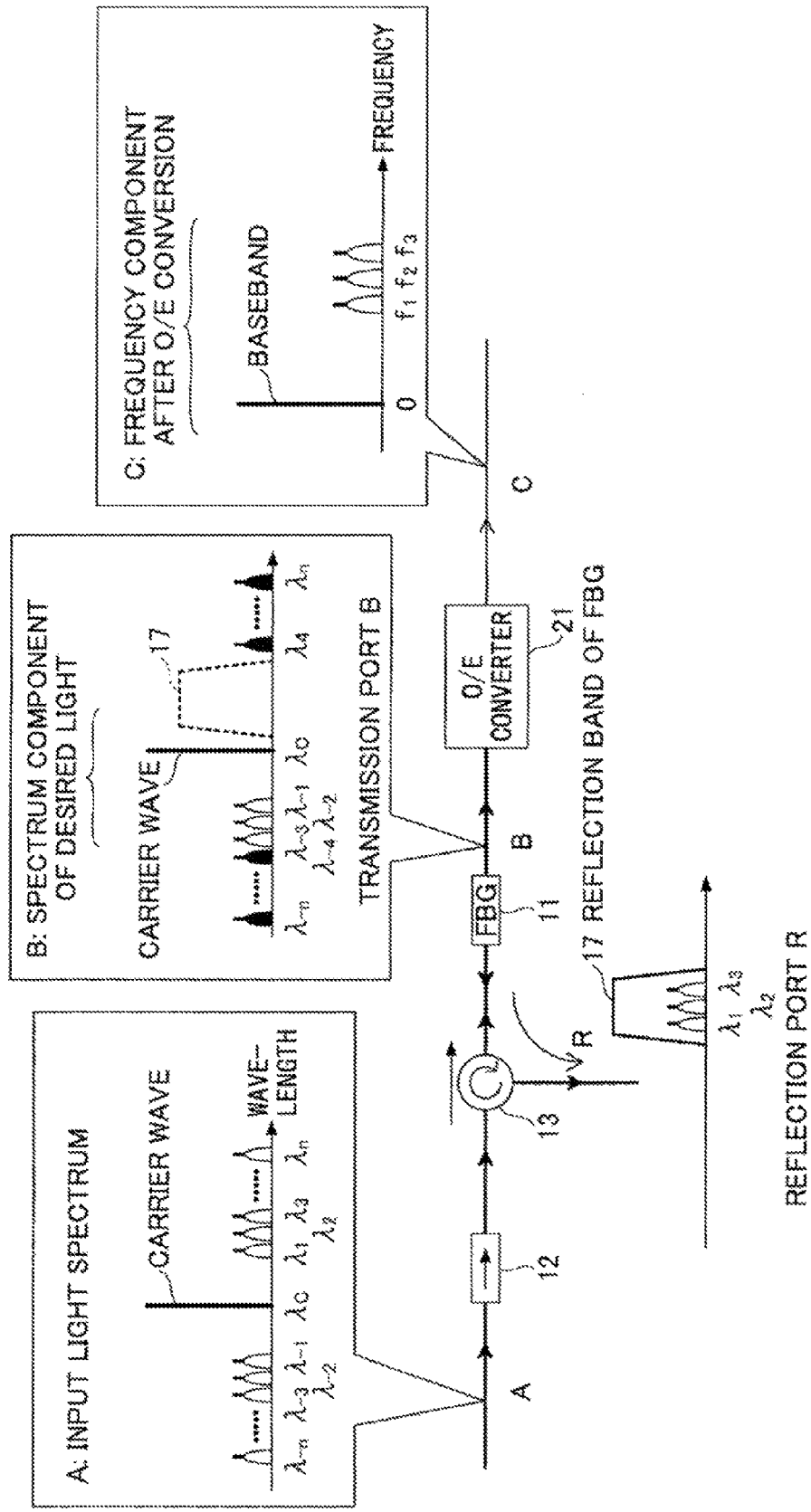
FIG. 11 illustrates an advanced example of spectrum shaping for extracting a desired light component making use of the cancellation (or offset) characteristic of the Bessel function.

FIG. 11 illustrates an advanced example 1. The input light signal contains information components which have been phase-modulated at carrier frequencies $f_1, f_2, \ldots, f_n$, and multiplexed onto the carrier wave $\lambda c$. The input light signal has a light spectrum A observed at point A, which spectrum contains the carrier wave $\lambda c$, light components $\lambda_{-1}, \lambda_{-2}, \ldots, \lambda_{-n}$, in the short-wavelength-side waveband, and light components $\lambda_1, \lambda_2, \ldots, \lambda_n$ in the long-wavelength-side waveband. The input light signal is supplied via the optical isolator 12 and the optical circulator 13 to the FBG 11. The FBG 11 is designed so as to reflect (or block) a specific portion 17 of the modulated light signal, corresponding to targeted channel components to be extracted.

For example, to extract only the modulated light components $\lambda_{-1}, \lambda_{-2}$ and $\lambda_{-3}$ together with the carrier wave $\lambda c$, the reflecting band of the FBG 11 is set to or near the range $\lambda_1$ to $\lambda_3$. In this case, only the modulated light portion 17 including $\lambda_1$ to $\lambda_3$ is reflected from the FBG 11 and back to the reflecting port R via the optical circulator 13. On the other hand, all the light components $\lambda_{-1}, \lambda_{-2}, \ldots, \lambda_{-n}$, in the short-wavelength-side waveband, and light components $\lambda_4$ to $\lambda_n$ in the long-wavelength-side waveband are output, together with the carrier wave $\lambda c$, to the transmission port B. Actually desired portion in the light spectrum B observed at point B is the carrier wave $\lambda c$ and the modulated light components $\lambda_{-1}, \lambda_{-2}$ and $\lambda_{-3}$. The spectrum-shaped light signal extracted at the transmission port B is input to the optical-to-electric converter 21. Since signal components corresponding to $\lambda_4$ to $\lambda_n$ have symmetric wavelength components in both the short-wavelength-side waveband and the long-wavelength-side waveband (i.e., the darkened components in the light spectrum B observed at the transmission port B), these components cancel each other. Consequently, only the frequency components $f_1$, $f_2$ and $f_3$ appear as the O/E converted RF spectrum component C. Then, using an electric filter 31 (any one illustrated in FIG. 7A through FIG. 7C), a targeted signal with a desired frequency component is finally extracted.

It is noted that, to extract specific modulated light components corresponding to $f_1$ to $f_3$, the reflecting band of the FBG 11 may be set to or near the range $\lambda_{-3}$ to $\lambda_{-1}$. In this case, the carrier wave $\lambda c$ and the modulated light components $\lambda_1$, $\lambda_2$ and $\lambda_3$ are extracted at the transmission port B. Since modulated light components $\lambda_4$ to $\lambda_n$ and modulated light components $\lambda_{-n}$ to $\lambda_{-4}$ cancel each other in the photodetection, an electric signal containing the desired frequency components $f_1$ to $f_3$ can be obtained from the optical-to-electric converter 21.

The arrangement illustrated in FIG. 11 is advantageous because it is unnecessary to convert unwanted light components into RF signal components. When placing an RF amplifier (see FIG. 7B and FIG. 7C) after the optical-to-electric converter 21, a specific band component is amplified. Thus, the amplification efficiency is improved.

This arrangement is also advantageous from the viewpoint of security. Various types of data items can be multiplexed onto an optical FDM signal, including pictures or video signals, monitoring information, and data from the Internet. These information items may be contained in a signal channel. In addition, such information may be received at many places, rather received at only one place. In the latter case, the power of the light signal is branched and demodulated at multiple places. If all the light components are converted into an electric signal at each optical receiver, a signal component supposed to be prevented from being received at that optical receiver may be easily extracted through the electric filter (RF filter).

In contrast, with the arrangement illustrated in FIG. 11, the light spectrum shaper 11 performs spectrum shaping such that a specific portion of wavelength components corresponding to a target channel (and its adjacent channels) is removed from only one of the short-wavelength-side waveband and the long-wavelength-side waveband. The outcome of the optical-to-electric conversion of the spectrum-shaped light signal exhibits the specific channel(s). Thus, the likelihood of eavesdropping or tapping can be reduced by the simple hardware structure. The arrangement of FIG. 11 is superior in security from the viewpoint of allowing a specific channel to be received through O/E conversion.

Two or more light-spectrum shapers 11 may be arranged in multiple stages if it is difficult for a signal optical filter or a signal FBG to realize a desired spectrum shaping. An arbitrary number of light-spectrum shapers may be selected depending on the use and performance.

Figure 12:
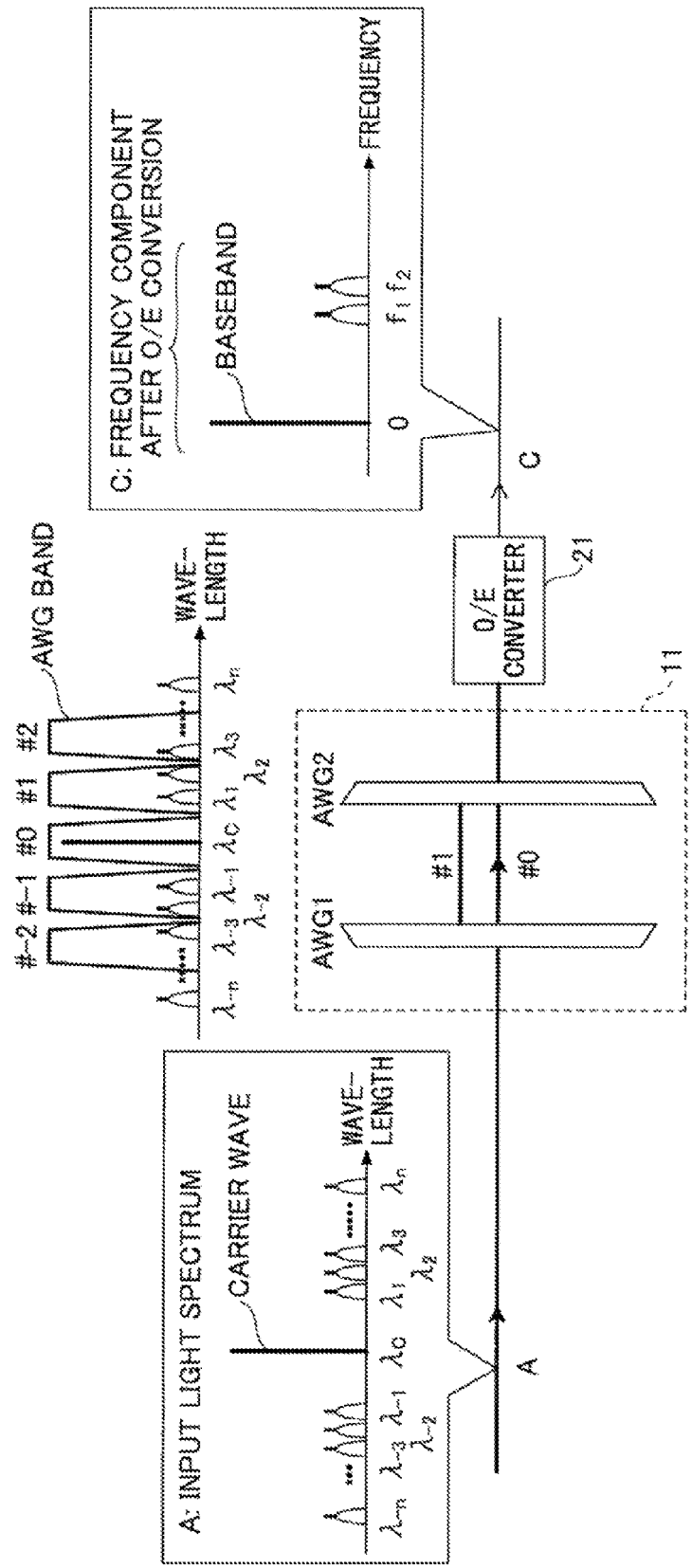
FIG. 12 illustrates another example of spectrum shaping for extracting a desired light component using an arrayed waveguide grating (AWG) as a light spectrum shaper.

FIG. 12 illustrates an advanced example 2. In this example, an arrayed waveguide grating (AWG) is used as the light spectrum shaper 11. This arrangement can achieve the same effect as one illustrated in FIG. 11.

An AWG is a device with N input ports and one output port, or one input port and N output ports, which is capable of mixing/dividing multi-wavelength light signals at a time. The AWG is a comb-shape optical filter with a periodic filter pattern. In FIG. 12, two AWGs are arranged so as to serve as the light spectrum shaper 11.

The N-channel ($f_1$ through $f_n$) multiplexed optical FDM signal has a light spectrum A observed at point A, which spectrum contains the carrier wave $\lambda c$ and modulated light components $\lambda_1$-$\lambda_n$ and $\lambda_{-1}$-$\lambda_{-n}$ on either side of the carrier wave $\lambda c$. The optical FDM signal is input to the first AWG (AWG1), dispersed into the respective light components, and output from N output ports. The AWG1 is adapted to have a transmission band corresponding to the frequency division multiplexing band of the optical FDM signal. For example, the AWG1 is designed such that the center wavelength ($\lambda c$) of the main carrier agrees with the center wavelength of the port #0.

The second AWG (AWG2) is used to mix the dispersed light components. In this process, the port #0 that contains the carrier wave $\lambda c$ and a desired port that contains targeted channels to be demodulated are selected for the light mixing. If targeted channels are $f_1$ and $f_2$, then the port #1 provided corresponding to wavelengths of $\lambda_1$ and $\lambda_2$ is selected, together with port #0, as illustrated in FIG. 12. Accordingly, the carrier wave $\lambda c$ and the modulated light components containing $\lambda_1$ and $\lambda_2$ are incident on the optical-to-electric converter 21. The O/E converted output C from the optical-to-electric converter 21 is an electric signal containing a baseband and frequency components $f_1$ and $f_2$. This electric signal is supplied to the electric filter (RF filter) 31 to extract the targeted channels.

Similar to FIG. 11, it is unnecessary for the arrangement of FIG. 12 to receive all the channels in the electric signal because only specific channels are selected for the optical-to-electric conversion. This arrangement is advantageous from the viewpoint of security.

Although in FIG. 12 two wavelength components such as $\lambda_1$ and $\lambda_2$ are contained in a transmission band of the AWG, the arrangement is not limited to this example. Three or more wavelength components may be included in a wavelength group to be guided to the corresponding output port.

As has been described, the optical receivers of the embodiments can extract a targeted channel from a phase-modulated optical FDM signal and therefore reliable reception of the optical FDM signal is realized. If the spectrum of the optical FDM signal is shaped so as to extract only a desired portion of the modulated light components, which portion contains the targeted channels, together with the carrier wave (main carrier), optical communications superior in security are realized.

The invention is applicable to an optical communication system, including one transmitting and receiving a phase-modulated optical FDM signal. The above-described receiver is applicable to arbitrary electronic equipment used in an optical communication system, or a transmitter/receiver device for relaying signals between electronic devices, such as between an optical connector and an LSI device placed on a server blade.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiments of the present inventions have been described in detail, it should be understood that the various changes, substitutions, and alterations could be made hereto without departing from the spirit and scope of the invention.

What is claimed is:

1. A receiver receiving a phase-modulated optical frequency division multiplexed signal, comprising:
 a light spectrum shaper configured to extract a carrier wave and a modulated light component contained in either one of a short-wavelength-side waveband or a long-wavelength-side waveband with respect to the carrier wave, to output a spectrum-shaped light signal; and
 an optical-to-electric converter configured to convert the spectrum-shaped light signal into an electric signal,
 wherein the light spectrum shaper is configured to extract a first specific portion of modulated light components contained in said one of the short-wavelength-side waveband and the long-wavelength-side waveband, together with the carrier wave,
 wherein the light spectrum shaper includes a fiber Bragg grating configured to remove a second specific portion of the modulated light components from another of the short-wavelength-side waveband and the long-wavelength-side waveband, the second specific portion corresponding to the first specific portion symmetrically with respect to the carrier wave; and
 wherein the optical-to-electric converter is configured to cancel out all the modulated light components except for the carrier wave and the first specific portion of the modulated light components contained in said one of the short-wavelength-side waveband and the long-wavelength-side waveband, from the spectrum-shaped light signal.

2. The receiver according to claim 1, further comprising:
 an electric filter connected to the output of the optical-to-electric converter and configured to extract a targeted channel from the optical-to-electrically converted electric signal.

3. The receiver according to claim 1, wherein the light spectrum shaper includes an optical filter.

4. The receiver according to claim 1,
 wherein the carrier wave and the modulated light component contained in said one of the short-wavelength-side waveband and the long-wavelength-side waveband are extracted at a transmission port or a reflection port of the fiber Bragg grating.

5. The receiver according to claim 4, further comprising:
 an optical isolator configured to be provided before the fiber Bragg grating; and
 an optical circulator configured to be provided between the optical isolator and the fiber Bragg grating.

6. The receiver according to claim 1,
 wherein the light spectrum shaper includes a first arrayed-waveguide grating and a second arrayed-waveguide grating, and
 wherein the first arrayed-waveguide grating separates the phase-modulated optical frequency division multiplexed signal into multiple modulated light components, and the second arrayed-waveguide grating selectively combines and outputs the carrier wave and the first specific portion of the modulated light components among the separated modulated light components.

7. The receiver according to claim 1, wherein the optical-to-electric converter converts the modulated light component of the spectrum-shaped light signal into a frequency component based upon a wavelength distance between the carrier wave and the modulated light component contained in said one of the short-wavelength-side waveband and the long-wavelength-side waveband.

8. A light spectrum shaping method, comprising:
 receiving a phase-modulated optical frequency division multiplexed signal as an input light signal;
 extracting a carrier wave together with a modulated light component contained in either one of a short-wavelength-side waveband or a long-wavelength-side waveband with respect to the carrier wave to output a spectrum-shaped light signal,
 extracting a first specific portion of modulated light components contained in said one of the short-wavelength-side waveband and the long-wavelength-side waveband, together with the carrier wave,
 removing a second specific portion of the modulated light components from another of the short-wavelength-side waveband and the long-wavelength-side waveband, the second specific portion corresponding to the first specific portion symmetrically with respect to the carrier wave; and
 cancelling out all the modulated light components except for the carrier wave and the first specific portion of the modulated light components contained in said one of the short-wavelength-side waveband and the long-wavelength-side waveband, from the spectrum-shaped light signal.

9. The light spectrum shaping method according to claim 8, wherein the extracting the carrier wave includes blocking a modulated light component contained in another of the short-wavelength-side waveband and the long-wavelength-side waveband, while transmitting the carrier wave and the modulated light component contained in said one of the short-wavelength-side waveband and the long-wavelength-side waveband.

10. The light spectrum shaping method according to claim 8, wherein the extracting the carrier wave includes transmitting a modulated light component contained in another of the short-wavelength-side waveband and the long-wavelength-side for removal, while reflecting the carrier wave and the modulated light component contained in said one of the short-wavelength-side waveband and the long-wavelength-side waveband for the extraction.

11. The light spectrum shaping method according to claim 8, wherein the extracting the carrier wave includes separating the phase-modulated optical frequency division multiplexed signal into multiple modulated light components, and selectively combining and outputting the carrier wave and a specific portion of the modulated light components contained in said one of the short-wavelength-side waveband and the long-wavelength-side waveband among the separated modulated light components.

12. An optical communication system comprising:
 an optical medium configured to transmit a phase-modulated optical frequency division multiplexed signal; and
 a receiver configured to receive the phase-modulated optical frequency division multiplexed signal through the optical medium,
 wherein the receiver extracts a carrier wave and a modulated light component contained in either one of a short-wavelength-side waveband or a long-wavelength-side waveband with respect to the carrier wave from the phase-modulated optical frequency division multiplexed signal, and converts the extracted light signal component into an electric signal, wherein the receiver has a light spectrum shaper configured to remove a first specific portion of the modulated light components contained in another of the short-wavelength-side waveband and the long-wavelength-side waveband from the phase-modulated optical frequency division multiplexed signal, and wherein the carrier wave and only a second specific potion of the modulated light components contained in said one of the short-wavelength-side waveband and the long-wavelength-side waveband are converted into the electric signal, while all other modulated light components are canceled out through the optical-to-electric conversion, the second specific portion corresponding to the first specific portion symmetrically with respect to the carrier wave.

13. The optical communication system according to claim 12, wherein the receiver further includes an electric filter configured to extract a targeted channel from the optical-to-electrically converted electric signal.

14. The optical communication system according to claim 12, wherein the receiver has a light spectrum shaper configured to extract the carrier wave and the modulated light component contained in said one of the short-wavelength-side waveband and the long-wavelength-side waveband from the phase-modulated optical frequency division multiplexed signal to output a spectrum-shaped light signal, and wherein an entirety of the spectrum-shaped light signal is converted into the electric signal through the optical-to-electric conversion.

15. The optical communication system according to claim 12, where the receiver has a light spectrum shaper configured to selectively extract the carrier wave and a specific portion of the modulated light components contained in said one of the short-wavelength-side waveband and the long-wavelength-side waveband to output a spectrum-shaped light signal, and wherein the spectrum-shaped light signal is converted into the electric signal through an optical-to-electric conversion.

* * * * *